United States Patent
DeYonker et al.

(10) Patent No.: US 7,603,688 B2
(45) Date of Patent: Oct. 13, 2009

(54) CYCLING OF RECORDING STATES FOR PROGRAM SELECTIONS DURING VIDEO RECORDING CONFLICT RESOLUTIONS

(75) Inventors: Aaron J. DeYonker, Seattle, WA (US); Peter J. Potrebic, Calistoga, CA (US); Thomas H. Taylor, Redmond, WA (US); Jeffrey C. Fong, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 989 days.

(21) Appl. No.: 10/946,817

(22) Filed: Sep. 22, 2004

(65) Prior Publication Data

US 2006/0037048 A1 Feb. 16, 2006

Related U.S. Application Data

(63) Continuation of application No. 10/918,847, filed on Aug. 13, 2004.

(51) Int. Cl.
*G06F 3/00* (2006.01)
*G06F 13/00* (2006.01)
*H04N 5/445* (2006.01)

(52) U.S. Cl. .......................... 725/58; 725/89; 725/134; 725/142

(58) Field of Classification Search .................... 725/58, 725/89, 134, 142; 386/37, 124
See application file for complete search history.

(56) References Cited

U.S. PATENT DOCUMENTS

| | | | |
|---|---|---|---|
| 5,307,173 A | 4/1994 | Yuen | |
| 5,686,954 A | 11/1997 | Yoshinobu | |
| 6,177,931 B1 * | 1/2001 | Alexander et al. | 725/52 |
| 6,240,240 B1 | 5/2001 | Nagano | |
| 6,344,878 B1 | 2/2002 | Emura | |
| 6,642,939 B1 | 11/2003 | Vallone | |
| 6,756,997 B1 | 6/2004 | Ward | |
| 6,980,730 B2 * | 12/2005 | Hawkins | 386/46 |
| 7,218,839 B2 | 5/2007 | Plourde | |
| 7,369,750 B2 * | 5/2008 | Cheng et al. | 386/83 |
| 2003/0070183 A1 * | 4/2003 | Pierre et al. | 725/135 |

(Continued)

FOREIGN PATENT DOCUMENTS

EP 0705036 4/1996

(Continued)

OTHER PUBLICATIONS

Office Action dated Jul. 9, 2008 cited in related Application No. 10/918,847 (Copy Attached).

(Continued)

*Primary Examiner*—Scott Beliveau
*Assistant Examiner*—Alexander Q Huerta
(74) *Attorney, Agent, or Firm*—Workman Nydegger

(57) ABSTRACT

The present invention generally relates to conflict management resolution. Typically systems for resolving conflicts between television programs with coinciding broadcast schedules use preferences, a confusing and limited display, or a combination thereof. The present invention, on other hand, provides for determining time spans or time slices, that indicate the duration of the conflict, and uses these to determine the available recording options. These can then be displayed in a user friendly interface, that is easy to understand and simple to use. In addition, other example embodiments ensure that the various programs and/or available options are capable of being cycled through, regardless of preference settings.

27 Claims, 10 Drawing Sheets

U.S. PATENT DOCUMENTS

| | | | |
|---|---|---|---|
| 2003/0154484 A1* | 8/2003 | Plourde et al. | 725/58 |
| 2003/0182567 A1* | 9/2003 | Barton et al. | 713/193 |
| 2003/0198462 A1* | 10/2003 | Bumgardner et al. | 386/83 |
| 2004/0078817 A1 | 4/2004 | Horowitz et al. | 725/58 |
| 2004/0103434 A1* | 5/2004 | Ellis | 725/58 |
| 2004/0210932 A1* | 10/2004 | Mori et al. | 725/39 |
| 2005/0235323 A1 | 10/2005 | Ellis | |
| 2005/0273819 A1* | 12/2005 | Knudson et al. | 725/58 |
| 2006/0179462 A1* | 8/2006 | Willame et al. | 725/90 |
| 2008/0034391 A1* | 2/2008 | Lehman et al. | 725/59 |

FOREIGN PATENT DOCUMENTS

| | | |
|---|---|---|
| EP | 0836320 | 4/1998 |
| JP | 07021619 | 1/1995 |
| JP | 09180292 | 7/1997 |
| JP | 10021601 | 1/1998 |
| JP | 10341381 | 12/1998 |
| JP | 11259927 | 9/1999 |
| JP | 11313280 | 11/1999 |

OTHER PUBLICATIONS

Office Action dated Dec. 23, 2008 cited in Application No. 10/917,847 (Copy Attached).

Office Action dated Mar. 23, 2009 cited in Application No. 10/917,847 (Copy Attached).

Office Action dated Feb. 18, 2009 cited in Application No. 10/946,817 (Copy Attached).

* cited by examiner

CYCLING OF RECORDING STATES FOR PROGRAM SELECTIONS DURING VIDEO RECORDING CONFLICT RESOLUTIONS

CROSS-REFERENCE TO RELATED APPLICATIONS

This application is a continuation of U.S. patent application Ser. No. 10/918,847 filed on Aug. 13, 2004.

BACKGROUND OF THE INVENTION

1. The Field of the Invention

The present invention generally relates to resolving conflicts for programs scheduled to record with coinciding broadcast schedules. More particularly, the present invention provides for determining a conflict time span, which indicates the duration of the conflict between programs. Further, the present invention uses this conflict time span for determining available recording options for resolving the conflict and displays these options in a user interface. Other exemplary embodiments provide for ensuring that a user will be able to cycle through each of the available options regardless of the priority for the scheduled programs.

2. Background and Related Art

For years, home entertainment systems have allowed viewers to record television programs for later viewing. The earliest systems for recording television programs in a viewer's home were video cassette recorders (VCRs), which record audio/video signals on a magnetic tape recording medium or video cassette. In the early history of VCRs, the viewer tuned to the desired channel, waited for the program to start, and activated the VCR in order to record programs. Although this innovation allowed user to time shift programs, the user still had to be at home to activate the VCR. Accordingly, VCRs were soon equipped with programmable systems, which in response to user input, automatically initiated the recording process to record a program even when the VCR was unattended. Such programmable capabilities enabled viewers to record programs during sleeping hours, while the viewers were away from home, or at other times when it was not convenient to manually activate the recording process.

During recent years, other recording media in addition to magnetic tapes have become available. For instance, it is now common for television programs to be recorded on hard disks in set top boxes associated with televisions. Although different media are now available, the basic concept of recording television programs for later viewing has not significantly changed.

Another recent development is the electronic program guide (EPG), which graphically displays television program's listings on television screens. Although there are various EPGs being used today, typical EPGs display programs in a grid format for multiple channels and various time slots. Accordingly, the view scrolls along both horizontal and vertical axis to identify television programs being broadcast at different times and on different channels. By simply a glance at an EPG, a viewer can easily learn what program is being broadcast on a specific channel during a specific time.

While EPGs can assist the viewer in identifying when programs are being broadcast, they have also been used to streamline the process of programming recording systems. For instance, viewers can use the EPG to identify when a program is to air, and manually set the recording device accordingly. Recently, however, depending upon the user interface associated with the set top box that includes the EPG, a viewer can use specific features on the UI of the set top box to program the recording system. For example, the viewer may simply select a box or region corresponding to a program within the EPG in order to schedule the program for recording. Alternatively, the viewer may be required to go to a different user interface page or display to cause the recording system to be programmed appropriately.

Regardless, of how a user schedules a television program for recording, viewers commonly encounter a situation in which they attempt or desire to record multiple television programs with overlapping broadcast schedules. Although multiple tuners within a set top box allow users to reduce the likelihood of conflicting programs, such tuners are expensive and are not available or upgradeable in many conventional systems. Accordingly, scheduled recordings with coinciding air times will often exceed the number of available tuners resulting in a conflict. In such instances, some form of conflict resolution will need to be performed.

In conventional systems, the selection of multiple programs for recording with competing program schedules was prohibited. Accordingly, if the viewer were to attempt to program the recording system to record conflicting programs, the viewer would first have to manually deselect a first program and then reselect the desired program. Other systems would allow a conflicting program to be selected, but would not indicate that a conflict existed; resulting in the viewer falsely believing that the program would be recorded.

More recently, however, recording conflicts between competing programs are resolvable through an automation process within the set top box. For example, some systems use preferences for resolving recording conflicts between programs. Such preferences may be set by a user or predefined by the manufacture. For example, a user may be able to rank desired recordings of programs by, e.g., a percentage. Other systems may provide a preference that indicates repeat programs (i.e., those that are recorded periodically such as a series) are either always or never preferred over non-repeat programs. Another preference may be that programs with alternative broadcast schedules (i.e., programs broadcast at a later time) are not to be selected. Alternatively, or in conjunction, the priorities may be based on the program genera, e.g., a preference for choosing comedies over drama. Preferences defined by the manufacture may be based on when the program was selected. For instance, the system may record the program based on a first in first out basis.

Conflict resolution based upon priority settings, however, has several down falls. For instance, because preferences resolve conflicts automatically, a user does not have full control over how conflicts are to be resolved. For instance, a first in first out preference always presumes that the user prefers later chosen programs over the more recently selected ones. Clearly, however, there will be times when the user prefers the opposite resolution. Accordingly, if the user is unaware of the resolution a less desirable program will be recorded.

Other systems provide a user with a display for resolving program recording conflicts. For example, when a user selects a program for recording, which conflicts with a previously selected program, a display similar to the one in FIG. 1 will be generated and presented to the viewer. In such instances, a choice for resolving the conflict is made (e.g., based on preferences) and the user is given a display 100 with a lot of text 105 to describe the conflict and the chosen resolution. The user is then prompted 110 to either accept or reject the chosen resolution. Although such systems allow a user more control than preferences alone, such conflict resolutions rely heavily on difficult to read and often confusing text 105 to describe the problem. Further, these systems allow for limited solutions. Accordingly, in a multi or dual tuner environment where multiple conflicts may exist, the user may not be able to understand the full range of options. As such, the user is presented with a confusing text-heavy display of the conflict with limited options.

Accordingly, there exists a need to assist a user in resolving conflicts in an easily understandable and user friendly way. Further, because there may be multiple tuner conflicts, there exists a need to be able to cycle through all available conflict resolution options.

BRIEF SUMMARY OF THE INVENTION

The above-identified deficiencies and draw backs of current conflict resolution systems are overcome by the present invention. For example, in an entertainment system that includes a recording device configured to automatically record scheduled television programs, the present invention provides for assisting a user in resolving conflicts between desired recorded programs with coinciding broadcast times by presenting available recording options in an easily understandable user interface.

For example, embodiments provide for receiving a request to record a program. Upon receiving a request, a recording conflict is identified between the request and at least one other program scheduled for recording with the coinciding broadcast time. In such instance, a time span for which the recording conflict exists is identified based on scheduled broadcast time information for each program in the recorded conflict. Based on the identified time span, available recording options are determined that will resolve the recording conflict. These available recording options are displayed in a user interface for allowing a user to select desired programs to be recorded.

Other exemplary embodiments provide for the ability to cycle through available recording options for resolving conflicts between programs for coinciding broadcast times. The system is configured to ensure that users are able to cycle state for each of the available recording options in succession. A conflict may be identified which exists between a plurality of programs based on coinciding broadcast times for portions of the plurality of programs. Initial state information for the plurality of the programs is then stored. This initial state information indicates which of the plurality of programs are initially enabled and disabled for recording. User input is then received that changes state of a first program from a disabled state to an enabled state. In response to the user input that changes state of the first program, the state of a second program is automatically changed from an enabled state to a disabled state. User input is again received that changes the state of the second program from a disabled state to enabled state. Based upon the initial state information, state for a third program of a plurality of programs is automatically changed from an enabled state to a disabled state.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems and computer program products for resolving recording conflicts for television programs with competing broadcast schedules. The embodiments of the present invention may comprise a special purpose or general-purpose computer including various computer hardware, as discussed in greater detail below.

The present invention relates to managing conflicts between coinciding programs that have been selected for recording in a recording system. Rather than simply resolving the conflict through priorities or providing a user display with difficult to understand text and limited selection options, the present invention provides for generating a user friendly interface that visually represents tuner conflict(s) in an easily understandable order to allow users to configure tuner scheduling with a full range of options and in a manner in which the user fully understands. Prior to discussing the invention in detail, however, it is useful to define some standard terms that will be used in describing exemplary embodiments of the present invention.

A "scheduled entry" or a "scheduled program" is a particular program instance within an electronic program guide.

Figure 1:
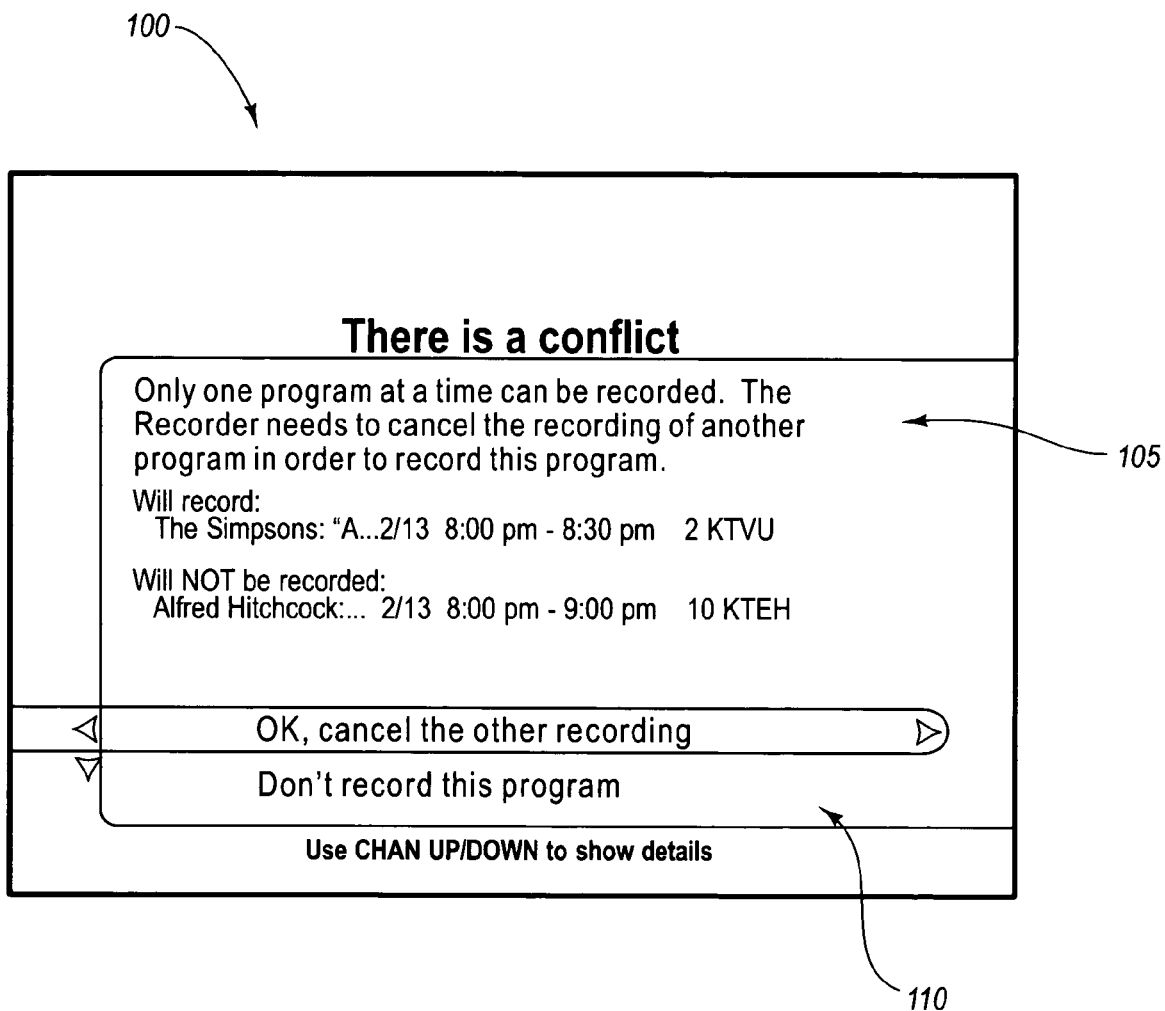
FIG. 1 is a prior art display used to resolve recording conflicts between programs.
Figure 2A:
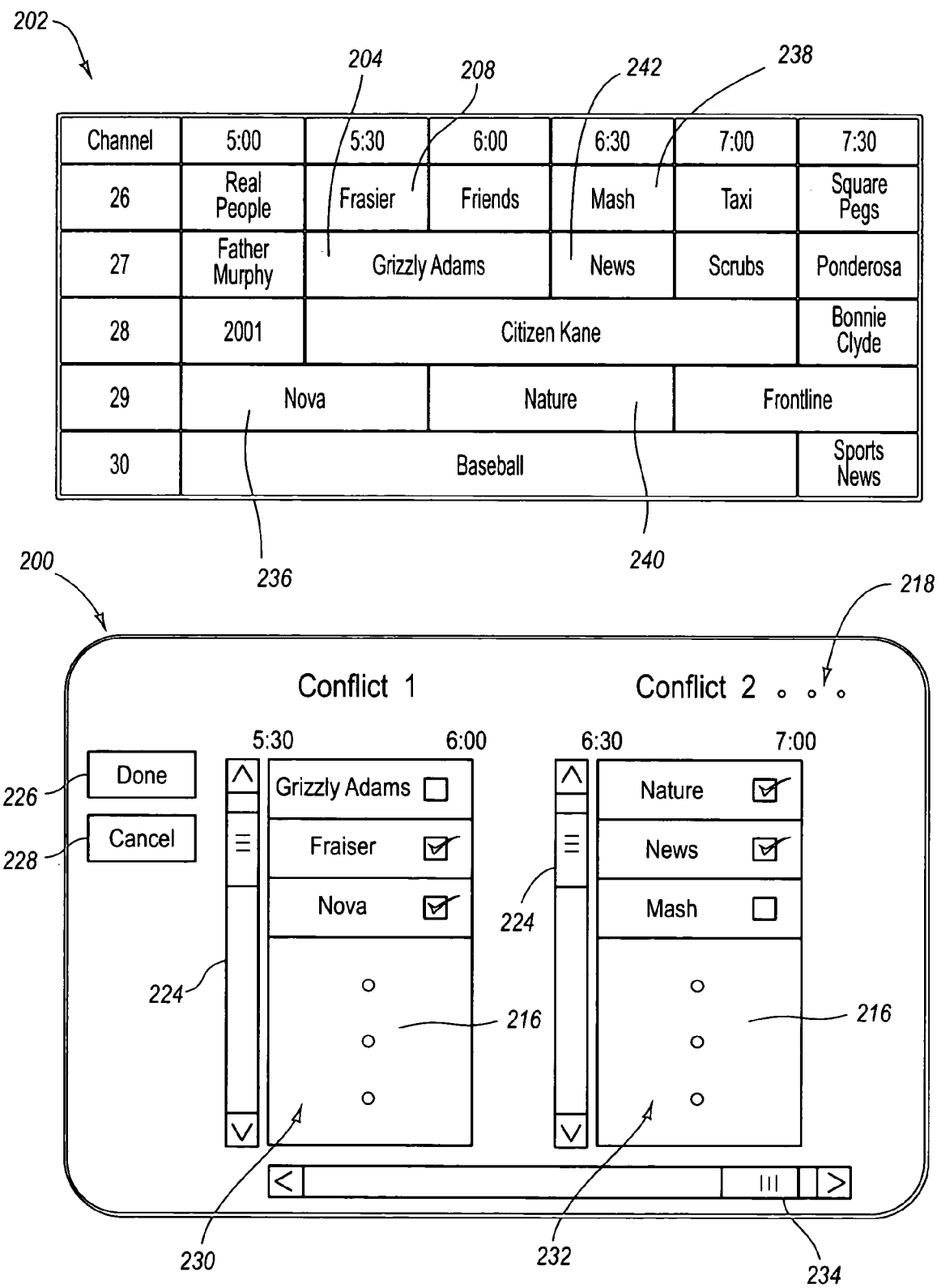
FIG. 2A illustrates an electronic programming guide that can be used for selecting various programs for recording and a conflict management user interface that can be generated in accordance with exemplary embodiments of the present invention.

Typically, a program entry is defined by a start and end time along with the channel. For example, as shown in FIG. 2A, scheduled program Frasier in field 208 of the electronic program guide 202 is scheduled to be broadcast between 5:30 and 6:00 on channel 26. Because a given program can air multiple times (e.g., a movie on HBO), an individual program may have multiple associated scheduled entries.

A "scheduled item" is a single particular scheduled entry in an electronic program guide, which is associated with a recording request. A "recording request" is a user's request to record a particular program, which includes both one time requests and series requests for repeated recordings (e.g., recording all airings of West Wing on NBC around 9:00 PM). A recording request will manage a set of scheduled items and even a one time recording request can have multiple scheduled items, e.g., one for each airing or scheduled entry of the movie.

As used herein, the term "recording system" or "recording device" refers to any apparatus or system that includes an apparatus for recording programs. Systems that include VCRs, digital video recorders (DVRs), any apparatus embodied in a set top box, in a television set, or in any other electronics component, personal computer, or any other recording apparatus using any type of recording medium represent examples of recording systems. The recording device may have only one tuner such that only one channel can be viewed and/or recorded at any one time. Alternatively, the recording devices of the present invention may have multiple tuners such that multiple channels can be viewed and/or recorded at any given time. Moreover, the components of the recording device are adapted to digital television signals as well as corresponding tuners adapted for analog television signals.

A recording conflict or just conflict, as provided herein, refers to coinciding or overlapping broadcast times for two or more scheduled items. Because scheduled items can have different start and ending times, conflict durations may extend to any time period, e.g., from a few seconds to several hours. This conflict duration as referred to herein is a conflict slice or time span, which, as described in greater detail below, may be represented in columns and/or rows in a user interface.

Conflict programs cause scheduled items to have any number of states. An "enabled state" means that the scheduled item is currently slated for recording. A conflict or "disabled state" means that the scheduled item will not record because some other coinciding or overlapping scheduled item or items are preventing the scheduled item from recording. A "redundant state" means that a scheduled item has multiple schedule entries that are alternative airing and indicates that another scheduled entry of this program will record, i.e., there is another scheduled item in the enabled state.

Exemplary embodiments provide for identifying when conflicts occur between two or more recording requests, and scanning through the broadcast times for the scheduled items for determining a time slice or time span for the conflict. Based on the determined time span, available recording options may be determined and displayed in a user interface for allowing a user to select desired programs for recording from among the available options.

FIG. 2A illustrates an example of the above-identified embodiment and shows an electronic program guide (EPG) 202 for selecting scheduled items and a user interface (UI) 200 for displaying the determined available recording options. In this example, EPG 202 may be used for making recording requests for scheduled items among a plurality of scheduled entries or programs. Only two tuners are available and a user has made recording requests for the following programs; Frasier 208, Grizzly Adams 204, NOVA 236, MASH 238, News 242, and Nature 240. It should be noted that although this example, and other examples of the present invention, reference a particular number of tuners, the present invention is not limited to any given number of tuners. Accordingly, the use of the number of tuners in this and the following examples are used for illustrated purposes only and are not meant to limit or otherwise limit the scope of the present invention.

Because there are only two tuners available, in this example there exist two conflicts. The first conflict exists between the recording request for Frasier 208 scheduled to be broadcast between 5:30 and 6:00, Grizzly Adams 204 scheduled to be broadcast between 5:30 and 6:30 and NOVA 236 scheduled to be broadcast between 5:00 and 6:00. The second conflict exists between MASH 238 that goes from 6:30 to 7:00, the News 242 also shown from 6:30 to 7:00 and the Nature program 240 scheduled to air between 6:00 and 7:00.

Exemplary embodiments provide for scanning through the various conflicts and identifying the time spans for which each conflict exist. For instance, when a conflict exists, exemplary embodiments provide for scanning through the EPG 202 for determining a time slice for each conflict. It is noted that although this example and following examples use EPG 202 to obtain scheduling information, e.g., program times, channels, alternative airings, etc., one would recognize that this broadcast information may be obtained in any number of ways. Further, the information may be stored locally, or may be received through broadcast information in a television signal. Accordingly, the following examples for obtaining and scanning broadcast time information, as well as other broadcast information, is used for illustrated purposes only and it is not meant to limit or otherwise limit the scope of the present invention.

Regardless of how the broadcast time information is received and parsed, exemplary embodiments provide for identifying a latest start broadcast time and an earliest end broadcast time from the program schedules for determining a time span for the conflicting scheduled items or programs. For example, as shown in FIG. 2A, the present invention will identify that Frasier 208, Grizzly Adams 204, and NOVA 236 are in conflict. As such, the present invention provides for identifying the latest start time(s) of these three programs, which is 5:30 for when Frasier and Grizzly Adams are aired. The present invention also determines the earliest end times for these programs, which is 6:00 when Frasier 208 and NOVA 236 end. This time slice from 5:30 to 6:00 defines the time span for the first conflict. As such, broadcast information for the time span is used to generate a user interface which will assist a user in resolving this conflict.

For example, as shown in user interface 200, conflict 1 is shown in column 230 and identified by the conflict time span of 5:30 to 6:00. Further, the program names are displayed as rows within the column wherein each row represents a recording request for conflict 1. In each conflict, at least one row will represent a program on an available tuner (i.e., program(s) that are enabled for recording) and at least one other row will represent scheduled item(s) that are in conflict (i.e., programs that are disabled for recording). The combinations of enabled programs (i.e., programs that are capable of being simultaneously recorded to resolve the conflict) make up the available options. As described in greater detail below, there are numerous ways of uniquely displaying programs that are enable (or disabled); however, in this example the enabled programs are shown with markings in a check box.

It should be noted that although the identified conflicts and available options in this example are illustrated in a grid-like fashion as columns and rows, any number of configurations are available to the present invention. For example, as described in greater detail below, available options may be presented to the user as rows from which the user can select a single row to resolve the conflict. Alternatively, the conflict may be represented in a grid-like fashion where the conflicts are represented in a horizontal fashion (as rows) and the programs making up the available options are displayed as columns. Accordingly, while an exemplary user interface design in FIG. 2A (as well as FIGS. 2B-2D and FIG. 3) for accomplishing one or more of the functions for determining a conflict time span and displaying available recording options based thereon, there exists numerous and possible infinite alternative user interface designs varying different aesthetic aspects for accomplishing these functions. As such, the design as shown in user interface 200 for displaying conflicts in a grid like fashion as column and rows is used for illustrated purposes only and it is not meant to limit or otherwise limit the scope of the present invention unless otherwise specifically claimed.

The present invention can determine any number of conflict time spans for any number of scheduled items. As such, user interface 200 may display any number of conflicts as represented by the horizontal ellipsis 218, and each conflict may include any number of programs or scheduled items where a recording request was made—as represented by the vertical ellipsis 216 in both columns 230 and 232. The number of conflicts and/or available options that can be displayed are based on numerous factors. For example, when display available options in a grid-like fashion, the size of the time span for each conflict, the number of programs within the conflict, the display resolution and size, etc., all effect the layout and visual representation of the available options. Nevertheless, scroll bars (e.g., 224, 235) or other items (e.g., scroll buttons (222 and 224 in FIG. 2B) can be used to visually display all conflicts and/or available options. Of course, it should be noted that any number of ways of scrolling through conflicts and/or available options are available to the present invention (e.g., automatic scroll using up/down and left/right controls), as such the use of scroll bars and/or buttons are used for illustrative purposes in the user interface and are not meant to limit or otherwise narrow the scope of the present invention.

As mentioned above, example embodiments allow for the scanning of numerous conflicts in determining the time span and presenting as many conflicts and/or available options in the user interface 202 as possible. For example, as shown in FIG. 2A, broadcast information for conflict 2 may be scanned (in a manner similar to that described above with regard to conflict 1) and a conflict time span can be determined for the programs MASH 238, News 242, and Nature 240. This conflict may then also be displayed in UI 200 in a grid-like fashion a column and rows 232 as previously described with regards to conflict 1. A user may then interact with the user interface 200 in selecting the desired recording programs (for either conflict 1 or conflict 2) by any number of well known means, e.g., the clicking of a mouse or using a remote control device to scan and select the various options. Further, the indication for identifying to the user the enabled or currently enabled scheduled items may be done in any fashion, e.g., highlighting, check boxes, radio buttons, or any other visual way to present to a user those items that are selected, or even not selected or disabled.

Exemplary embodiments provide that when the available options are presented to the user in the user interface 200, a number of scheduled items, e.g., those corresponding to the number of available tuners, in conflict time span(s) are automatically enabled for recording. For example, as shown in conflict 1, the user may be presented with the available option of Frasier and Nova enabled as indicated by the check in the check box for these programs. This initial selection may be determined by any number of ways. For example, the initial selection may be random or may be based on any number of algorithms, e.g., the lengths of shows, or any other arbitrary feature.

Alternatively exemplary embodiments provide that the initial available option(s) or selection of programs that are enabled may be based on preferences or priorities. These preferences may be one or more, but are not limited to, a percentage of desired program recordings, a ranking of desired program recordings, an order for which the programs were selected for recording, genre of the content for the programs, whether the programs are repeatedly recorded, or whether there are alternative broadcast schedules for the programs, or any other available preferences.

Alternatively, exemplary embodiments provide for simply displaying those programs that are in conflict with no initial selection. In such an embodiment, the user would be allowed to select from the conflicting programs within the list, up to the number of available tuners. As will be described in greater detail below, once the selection of programs reaches number of available tuner(s), any subsequent choices would result in a disabling of another selected item based on, e.g., a first in first out basis.

As stated above, regardless of how the initial programs are chosen, exemplary embodiments provide that when a program is selected by the user, and no other tuners are available for recording that program within the conflict, one of the other programs within the conflict is disabled (i.e., changed from an enabled state to a disabled state). Thus, the user can readily identify that by selecting a particular program that another one would be disabled thus presenting the user with an alternative option. Of course, if the user does not like the new option, i.e., the view or did not want the program disabled, the user can select that disabled program to change state which will result in a de-selection or disabling of another program within that same conflict. As will be described in greater detail below with regard to FIG. 3, exemplary embodiments provide for functionality that will allow the user to cycle through each available option regardless of the priority associated with the scheduled item.

Figure 2B:
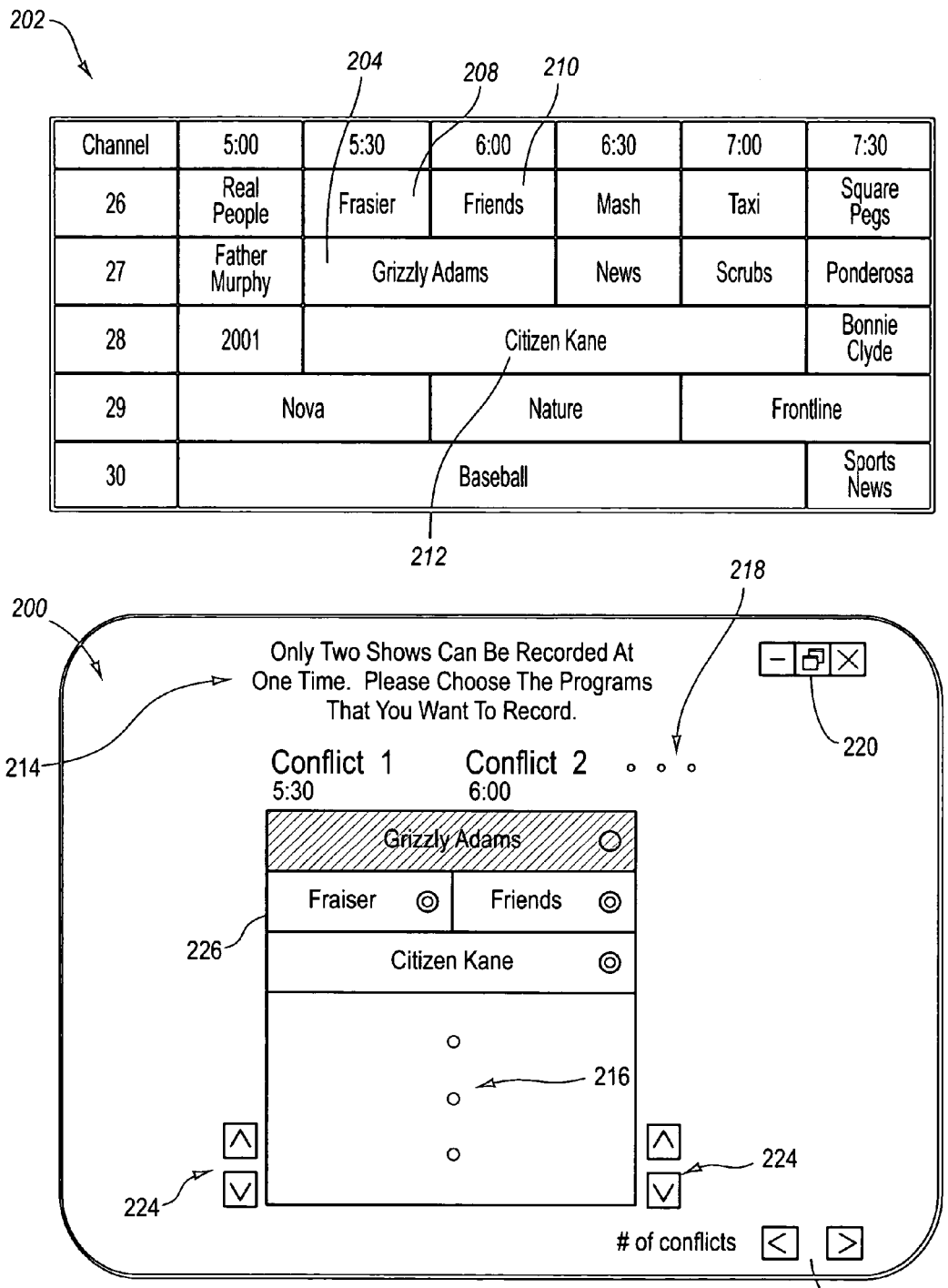
FIG. 2B illustrates another example of a conflict resolution management user interface that can be generated in accordance with exemplary embodiments of the present invention.

Once the user is satisfied with the programs that are enabled within each conflict, the user may save and close the interface through any number of well known means, e.g., the "done" button 226, wherein the enabled scheduled items are updated within the recording device. Although in the example of FIG. 2A a "done" or "cancelled" button 228 are shown and may be used in the user interface for saving and closing the conflicts management user interface, other well known means are also available. For example, as shown in FIG. 2B as standard user interface buttons 220, in FIG. 2C as a option of yes or no 252 to save changes, as a close and save button 258 in FIG. 2D, or any other well known and easy identifiable way to represent saving and closing out of the user interface 200. Accordingly, while an exemplary user interface design in FIGS. 2A-2D and 3 for accomplishing one or more of the functions for saving and closing the user interface, there exists numerous and possible infinite alterative user interface designs varying different aesthetic aspects for accomplishing these functions.

The present invention also provides example embodiments for assisting a user in resolving multiple conflicts at one time. For example, as shown in FIG. 2B, if the user selects in EPG 202 Frasier 208, Friends 210, Grizzly Adams 204 and Citizen available, exemplary embodiments provide for a scanning process similar to that described above for identifying the time span of conflicts. In this instance, a first conflict exists between programs airing from 5:30 to 6:00, which includes Grizzly Adams 204, Frasier 208, and Citizen Kane 212. A second conflict also exists as shown in user interface 200 between Grizzly Adams 204, Friends 210, and Citizen Kane 212. Based on the time spans, user interface 200 is generated and the available options are displayed to the user in an easy understandable way to view and manage the conflicts.

Again in this example user interface 200, the conflicts and scheduled programs are displayed in a grid-like fashion. Each conflict represents a column and the requested scheduled items are displayed as rows with an initial available option automatically chosen. As shown in user interface 200, a particular program may be included in multiple conflicts. For example, portions of Grizzly Adams 204 and Citizen Kane 212 are included in both conflicts. Accordingly, this example provides that Frasier 208, Citizen Kane 212 and Friends 210 are an initial option for resolving both conflict 1 and conflict 2 simultaneously. If a user wishes to change scheduled item Grizzly Adams 204 from the disabled state to an enabled state, at least one of the other enabled scheduled items in the two conflicts must be disabled since only two tuners are available.

In the event that either Frasier 208 or Friends 210 is disabled or deselected, example embodiments provide that both Frasier 208 and Friends 210 may be automatically deselected as a preference in resolving conflict 1 and conflict 2 simultaneously. Similarly other exemplary embodiments provide that if either Frazier 208 or Friends 210 is changed from a disabled state to an enabled state, both are simultaneously changed to be enabled.

Of course, other embodiments provide that any combination of programs may be selected. For example, for example the user may wish to record Grizzly Adams 204, Frasier 208 and the end of Citizen Kane 212. Such options may be desirable, e.g., when the user desires to watch a complete movie, but only wants to watch the last few innings of a baseball game. Alternatively, the viewer may wish for just the lead stories in a news broadcast, but does not want to miss a sitcom with a partially competing broadcast schedule. Accordingly, the above-described enabling and disabling of scheduled items for resolving multiple conflicts is used for illustrated purposes only and it is not meant to limit or otherwise limit the scope of the present invention.

Figure 2C:
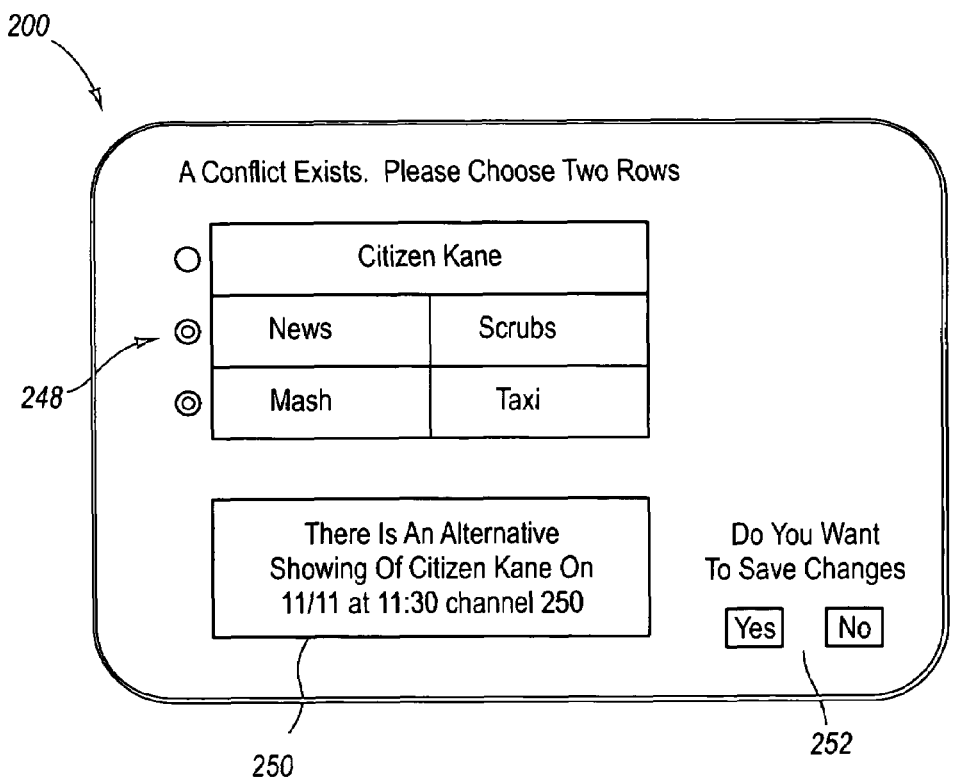
FIG. 2C illustrates yet another example of a conflict resolution management user interface used in resolving conflicts in accordance with embodiments of present invention.

In accordance with yet other example embodiments, FIG. 2C shows an alternative way to resolve multiple conflicts through one single user input. As shown in this example, a user requested recording using EPG 202 for MASH 238, News 242, Citizen Kane 212, Taxi 244 and Scrubs 246. Assuming again that there are only two available tuners, a first conflict is determined in accordance with the above described embodiments and identified through the time span of 6:30 to 7:00. This first conflict includes Citizen Kane 212, MASH 238, and News 242 scheduled items. A second conflict also exists as shown in user interface 200 during the determined time slice of 6:30 to 7:00 between Citizen Kane 212, Scrubs 242 and Taxi 244. Based on the time spans for the conflicts, available options are presented to the user in grid-like fashion 248, similar to that previously described above with regards to FIGS. 2A and B.

In this example, the half-hour programs were initially enabled as shown by the highlighted radio buttons to the left of grid 248, wherein entire rows are selected in order to resolve multiple conflicts rather than selecting the individual scheduled items. As such, the user input is minimal and presents an easy way to resolve multiple conflicts for recorded programs. It should be noted, however, that although the half-hour programs are shown in a particular row representing a particular tuner, these programs may be arbitrarily chosen for the tuner, or may be rearranged as desired by the user. Further, as above, the scheduled items may have individual radio buttons for selection of each program as above. Accordingly, the selection of the scheduled items and the tuners they will record on are used for illustrative purposes only and are not meant to limit or otherwise narrow the scope of the present invention unless otherwise explicitly claimed.

Other exemplary embodiments provide for showing a viewer alternative airings of programs in order to give the user full knowledge of available options. For example, as shown in user interface 200 of FIG. 2C, the user is presented with the information that an alternative showing of Citizen Kane exists as shown in box 250. The alternative showings may be based on a specific scheduled item, e.g., the disabled program(s). Further, the alternative broadcast information may be based on a single scheduled entry, or show alternative airings of multiple or all available alternative showings. The alternative airings that appear in box 250 may be based on the tentative selection of a scheduled item, e.g., putting a cursor over the item, or any other well know reasons for display information based on user interaction. Regardless of how the alternative airing is displayed or caused to be displayed, this information allows a user to be able to make a much more informed decision for resolving the conflict.

Figure 2D:
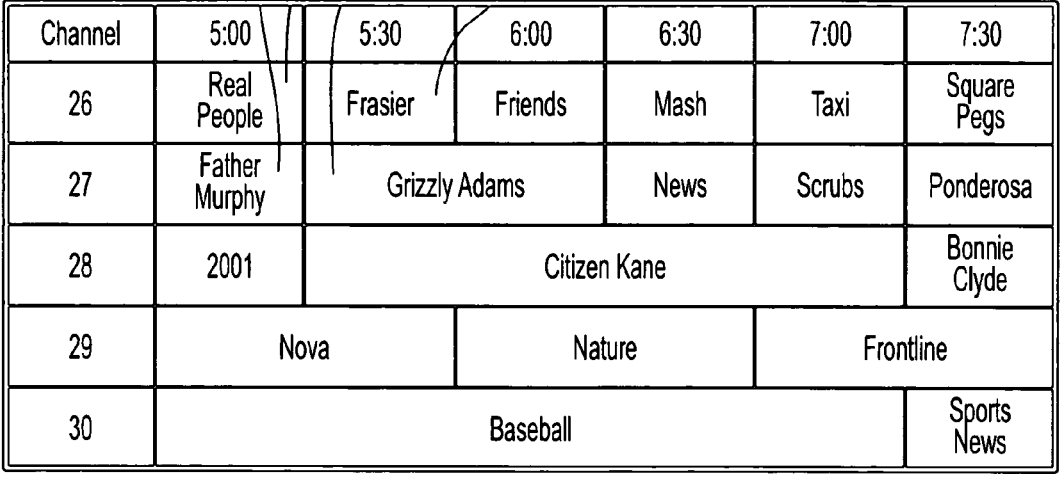
FIG. 2D illustrates an alternative conflict resolution user interface that can be generated in accordance with exemplary embodiments of the present invention.
Figure 2D:
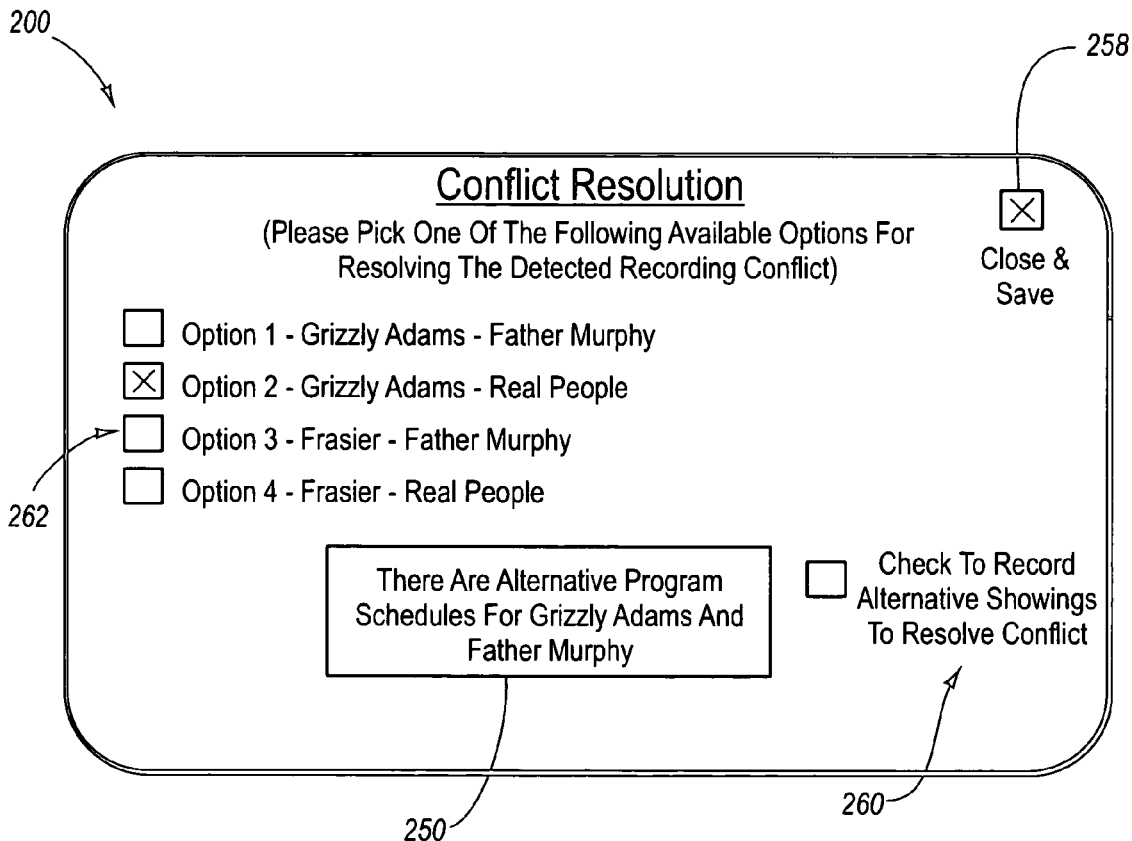

As shown in FIG. 2D, other exemplary embodiments provide other user interfaces that display the available options as rows in single column 262. In this example, the user selected Real People 256, Frasier 208, Father Murphy 254, and Grizzly Adams 204 from EPG 202. Assuming that there is only one tuner in the recording device, two conflicts are identified and the time span for each is calculated as previously described. The first conflict is between 5:00 and 5:30 between Real People 256 and father Murphy 254. The second conflict time span is between 5:30 and 6:00 for Frasier 208 and Grizzly Adams 204. Based on the time spans, the available options may be determined and presented as rows 262, which the user can select a single option 262 to resolve both conflicts.

Alternatively, rather than displaying all of the options in a single user interface 200, each option may be individually displayed to the user in separate user interfaces 200 with a prompt for indicating the viewer's desire for the option. Further, as shown in the user interface 200 a box 260 may be presented wherein if alternative program(s) would resolve both conflicts, this box may be selected (i.e., this option chosen) in order to simply resolve some or all of the existing conflicts. For example, as shown in box 250, and in this example, there are alternative schedules for Grizzly Adams 204 and Father Murphy 254. Because these alternatives would resolve both conflicts, the user may choose simply to select this option, wherein Real People 256 and Frasier 208 would be recorded (also shown as option 4) and the alternative airings would also be scheduled for recording.

As previously mentioned, when a user makes selections of programs, e.g., by choosing individual options, rows, scheduled items, etc., the user needs to be able to cycle through all states for the available programming options. In particular, as previously mentioned, when a user makes a selection that exceeds the number of available tuners, a de-selection or disabling of another program and/or option will occur. The de-selection, however, needs to occur for all programs and/or options, i.e., on successive de-selecting programs and/or options, state for each one need to be changed in order. If, however, preferences or priorities are strictly used in determining the de-selection or disabling of a state for a scheduled item, this may not always be the case.

Figure 3:
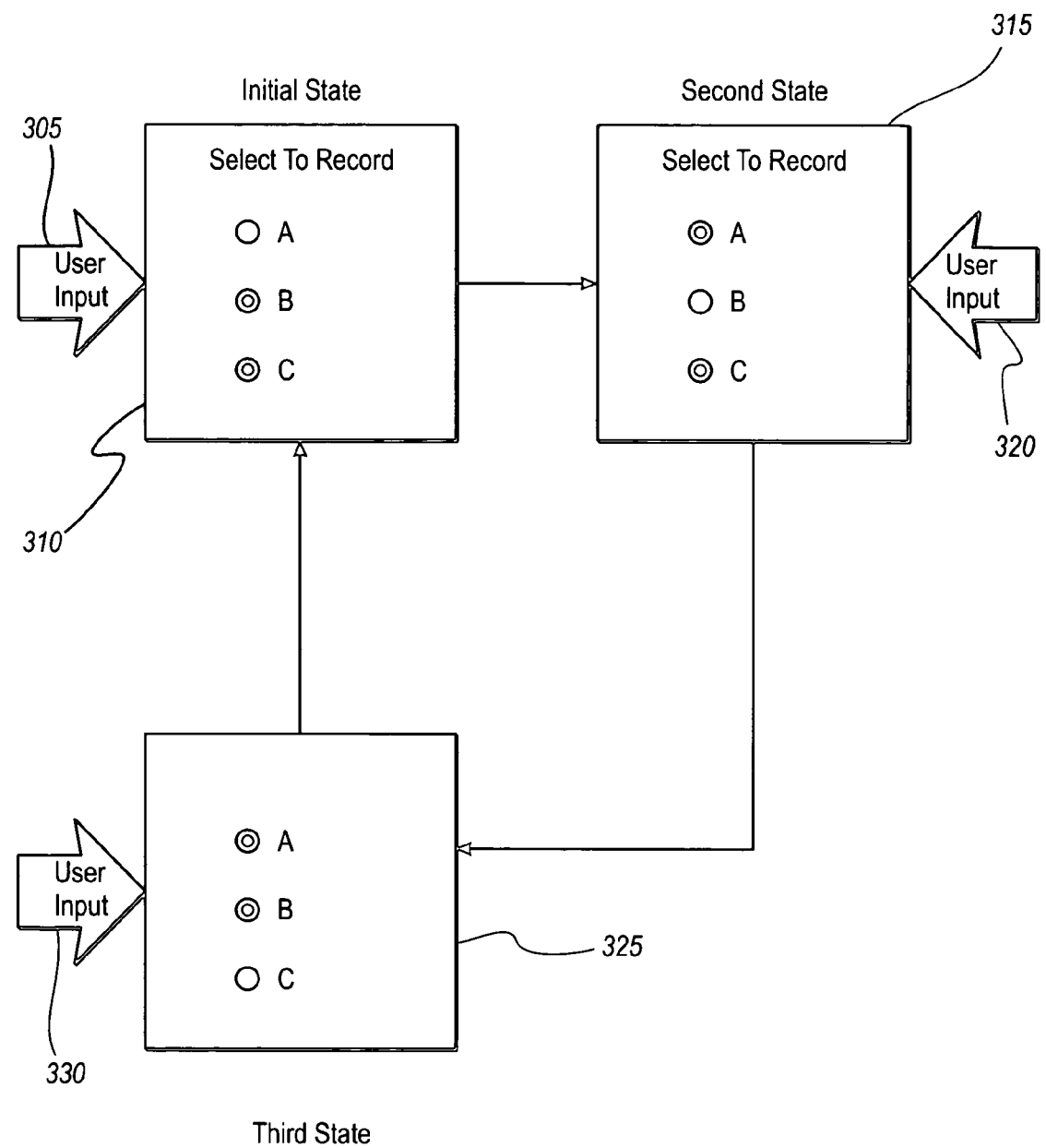
FIG. 3 illustrates the cycling of states for programs desired to be recorded through user input selection in accordance with exemplary embodiments of the present invention.

For example, as shown in FIG. 3, there are three scheduled items and/or available options A, B, and C with only two available tuners. As such, only two programs may be recorded at the same time. Assuming: (1) programs A, B and C have overlapping or coinciding broadcast times; (2) newly selected items receive lowest priority or preference; (3) the initial state 310 enables B and C; (3) the user sets C to a higher priority than item B; and (4) preference or priorities are strictly used in automatic disabling of items, than the following will occur. The user selects A to be enabled. Because C is higher priority than B, B is disabled, as shown in second state 315. If the user then selects B, because A was the newly selected item, C is higher priority than A, which disables A; thus returning to the initial state 310. This "ping-pong" effect will continue indefinitely, thus never allowing the selection of the combination of A and B.

In order to prevent the above ping-pong effect, exemplary embodiments ensure that all states for each available option may be cycled through. For example, again referring to FIG. 3, an initial state of 310 enables B and C. The present invention stores this state information, which will be used for future reference as described below. User input 305 is received selecting A to be enabled, resulting in the disabling of one of the currently enabled items—in this case B is disabled resulting in second state 315 wherein A and C are enabled. (It should be noted, that although B was disabled, the present invention works equally as well for any items transition in state, e.g., C changes from enabled to disabled.) This second state information 315 is also stored for future reference. Next, when user input 320 is received for changing the state of B from enabled to disabled, rather than using preferences to disable items, the present invention uses the initial state information to determine which item should be deselected. Therefore, because in the initial state of A was disabled, and because A is now enabled and B is selected to be enabled, the system determines that C should be disabled, resulting in third state 325 where A and B are enabled.

In other words, the present invention provides for remembering the previously selected scheduled items for each program and/or available options and using that information (in conjunction with an application program interface) to ensure appropriate cycling to each item and/or option. Accordingly, when third state 325 receives user input 330 to change the state of C from disabled to enabled, the second state information 315 may be used for transitioning back to the initial state 310. Although the above example used only two tuners, the above embodiment can be configured to handle N tuners. In particular, the present invention provides for remembering the previous N−1 selections of scheduled items and/or available options on a first in first out (FIFO) basis, and uses this information to ensure proper cycling. Accordingly, the above example for cycling through three available scheduled items and/or options is used for illustrative purposes only and is not meant to limit or otherwise narrow the scope of the present invention.

The present invention may also be described in terms of methods comprising functional steps and/or non-function acts. The following is a description of steps and acts that may be performed in practicing the present invention. Usually, functional steps describe the invention in terms of results that are accomplished where as non-functional acts describe more specific actions for achieving a particular result. Although the functional steps and non-functional acts may be described or claimed in any particular order, the present invention is not necessarily limited to any particular order or combination of acts and/or steps. Further, the use of act and/or steps in the recitation of the claims and in the following description of the flow charts for FIGS. 4-6 are used to indicate the desired specific use of such terms.

Figure 4:
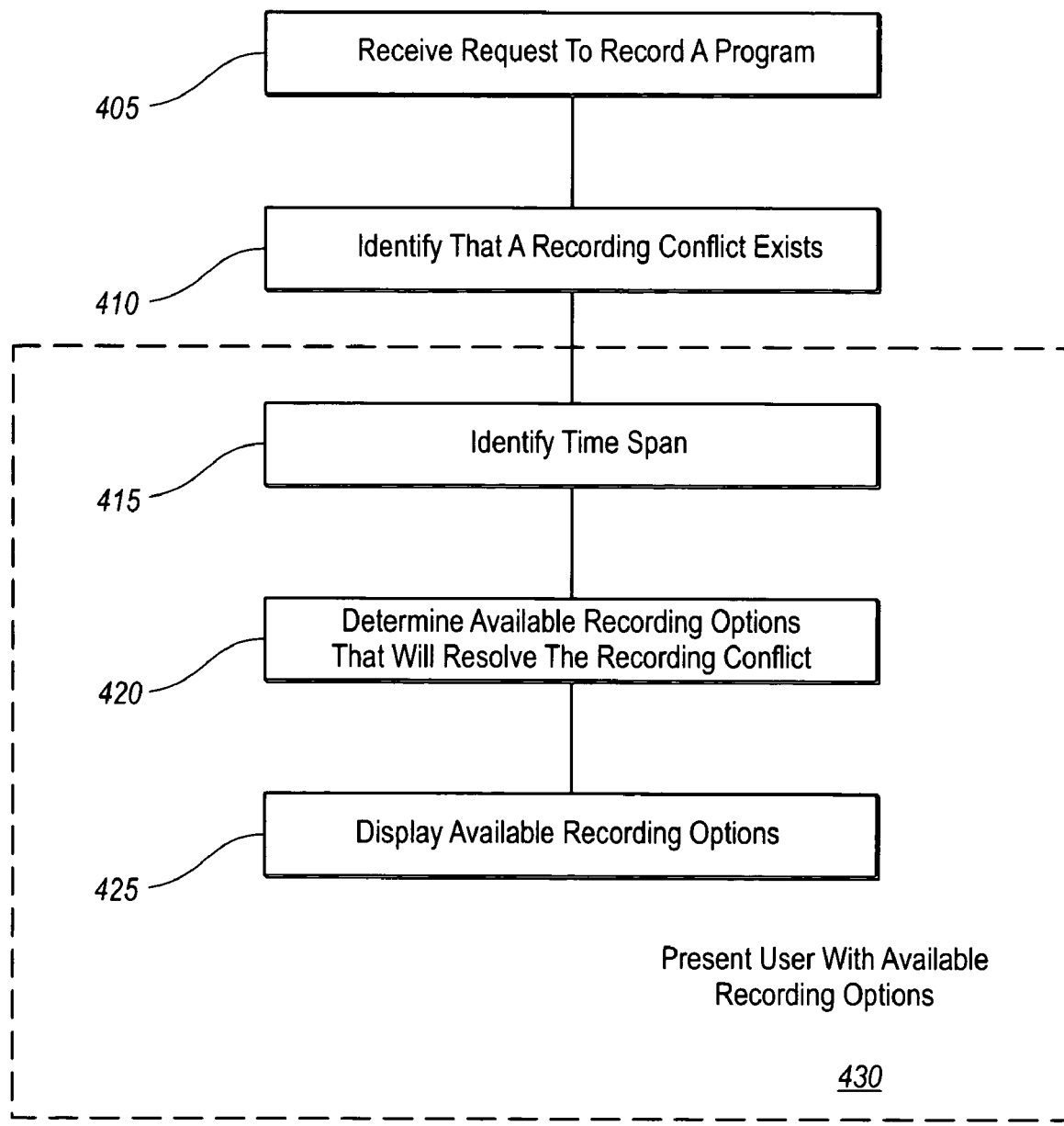
FIG. 4 illustrates an example flow chart of a method for assisting a user in resolving conflicts between desired recorded programs with coinciding broadcast times in accordance with the exemplary embodiments.
Figure 5:
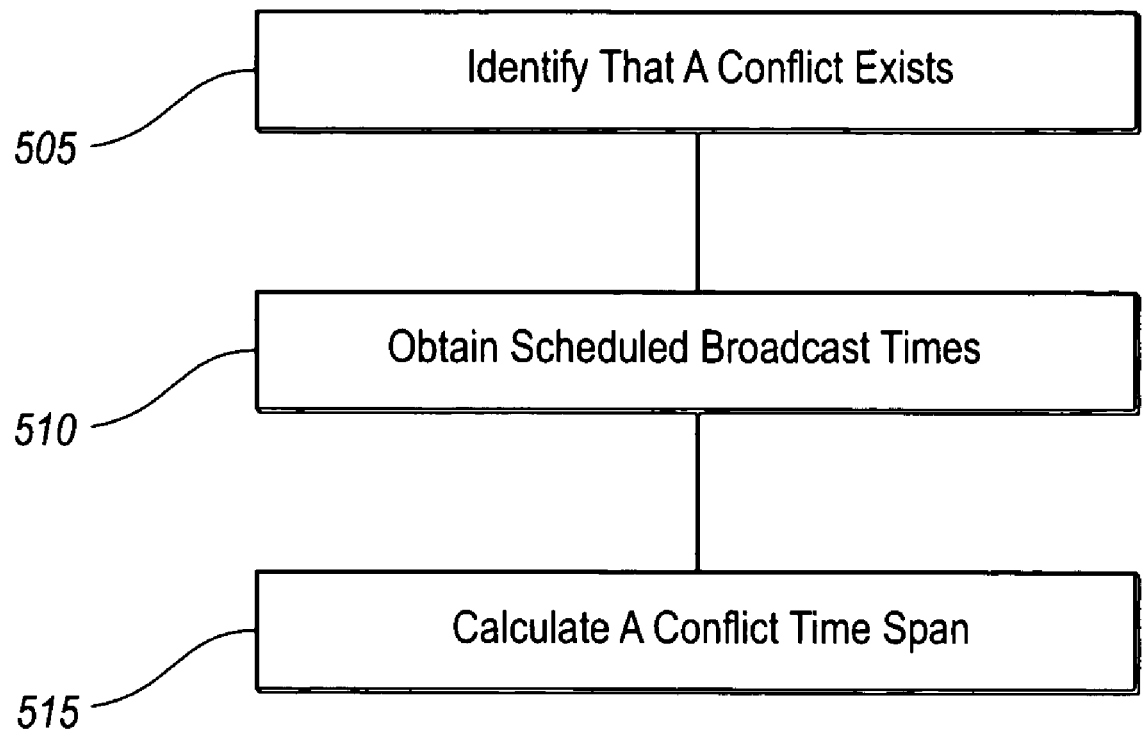
FIG. 5 illustrates an example flow chart of a method of identifying a recording conflict time span for programs with coinciding broadcast times in accordance with exemplary embodiments.
Figure 6:
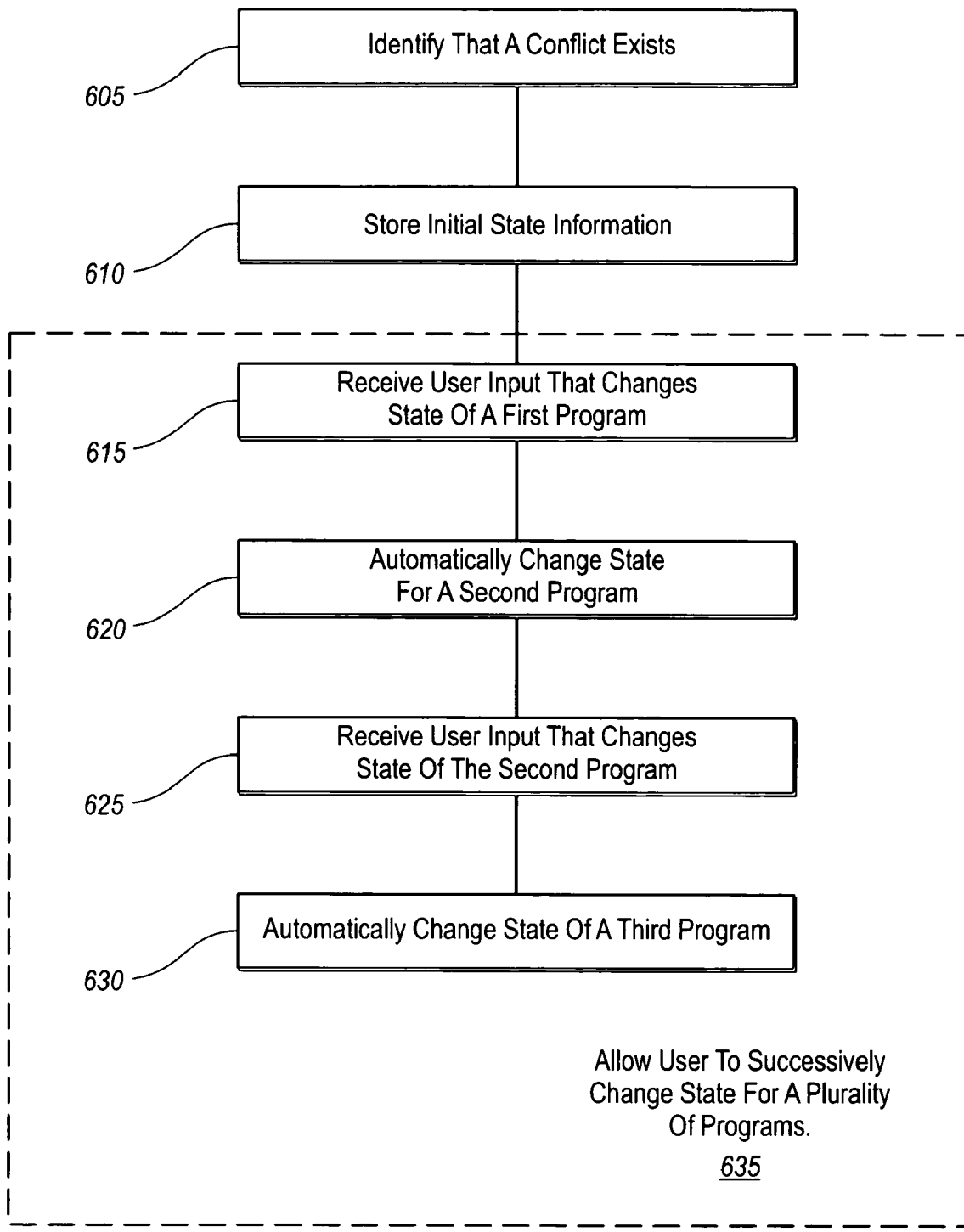
FIG. 6 illustrates an example flow chart of a method of cycle through available recording options for resolving conflicts between programs with coinciding broadcast times in accordance with exemplary embodiments.

FIGS. 4-6 illustrate example flow charts for various exemplary embodiments of the present invention. The following description of FIGS. 4-6 will occasionally refer to corresponding elements form FIGS. 2A-D and FIG. 3. Although reference may be made to a specific element from these Figures, such elements are used for illustrated purposes only and it is not meant to limit or otherwise narrow the scope of the present invention unless otherwise explicitly claimed.

FIG. 4 illustrates an example flow chart of a method 400 of assisting a user in resolving conflicts between desired recorded programs with coinciding broadcast times by presenting available recording options in an easily understandable user interface. Method 400 includes an act of receiving 405 a request to record a program. For example, EPG 202 may be used to select a scheduled entry for recording a scheduled item. Method 400 also includes an act of identifying 410 that a recording conflict exists. For example, if only a single tuner exists in the recording device, and MASH 238 and News 242 in EPG 202 are scheduled items to be recorded, a conflict is identified as these two programs have coinciding broadcast times from 6:30 to 7:00 with only one available tuner to record a program.

Method 400 also included a step for presenting 430 a user with available recording options. Step 430 may include an act of identifying 415 a time span. For example, based on scheduled broadcast time information for each program in the recording conflict, the systems may be configured to identify that the conflict for MASH 238 and News 242 has a time span from 6:30 to 7:00. Based on the identified time span, step 430 includes an act determining 420 available recording options that will resolve the recording conflict. For instance, as in the above example, to resolve the conflict between MASH 238 and News 242 items, the options are simply record MASH 238 or record News 242. Of course, with numerous tuners, there may be multiple available options based on the time span.

Finally, step 430 includes an act of displaying 425 available recording options. For example, the user interface 200 may be used to receive available recording options and display these on a display device, thereby allowing the user to select from among the available recording options. The recording options may be displayed in a grid-like fashion as column(s) and row(s), wherein one or more of the rows correspond to the number of available tuners and the columns correspond to the identified time spans for one or more conflicts. Further, a single row may span across multiple conflicts. In such a case; a single user input may be used to select a row that resolves multiple conflicts.

Enabled programs (i.e., those selected items set to be record) within user interface 200 may be identified by one or more of highlighting, selected radio button, marked check, etc. Similarly, disabled programs may be identified by highlighting, an unselected radio button, or market checked box, etc. Of course, any way of identifying and visually representing enabled and disable programs within a conflict are available to the present invention.

Rather than displaying the available recording options and/or programs in a grid-like fashion mentioned above, other exemplary embodiments provide that the recording options may be presented as a list. For example, as shown in FIG. 2D, the available recording options can be displayed as a list in a single column, allowing for a single user input to resolve the recording conflict. Alternatively, the options may be displayed one at a time, wherein a user would be prompted to indicate if they desire the current presented option.

In another embodiment, the conflicting programs may have alternative broadcasting schedules, which can be displayed and presented to the user. These alternative broadcasting schedules may be determined from analyzing EPG 202. Further, the available recording options may be based on the alternative broadcasting schedules, such as shown for the check box 260 in FIG. 2D. In such case other example embodiments provide that a single user input of selecting the alternative broadcast schedule automatically resolves one or more conflicts. Moreover, the alternative broadcasting schedules may be included in a broadcast signal to the recording device, or they may already be stored on the recording device.

Still other exemplary embodiments provide that user interface 200 can indicate an initial recording state of the available recording options. This indication identifies those programs that are currently enabled to be recorded and may be based on preferences or priorities for recording the programs. These priorities may be based on e.g., a percentage of desired program recordings, a ranking of desired program recordings, an order for which the programs were selected for recording, genre of the content for the programs, whether the programs are repeatedly recorded, whether there are alternative broadcast schedules for the programs, etc.

FIG. 5 illustrates an example flow chart of a method 500 of identifying a recording conflict time span for programs with coinciding broadcast times. Method 500 includes an act of identifying 505 that a conflict exists. For example, if only one tuner is available and MASH 238 and Citizen Cane 212 are selected as scheduled items to be recorded, because these items have coinciding broadcast times a conflict may be identified.

Method 500 also includes an act of obtaining 510 scheduled broadcast times. In particular, scheduled broadcast times for MASH 238 and Citizen Cane 212 (which are 6:30-7:00 and 5:30-7:30, respectively) may be obtained. Based upon the obtained scheduled broadcast times, method 500 also includes an act of calculating 515 a conflict time span. For example, the latest start broadcast time and earliest end broadcast time for the programs that are in conflict may be identified. In this case, the latest start time is for MASH 238 which airs at 6:30, and the earliest end time is also for MASH 238, which ends at 7:00. Using this information, a conflict time span may be calculated, which is from 6:30-7:00 in this example.

This conflict time span may then be used in order to determine the available options that will resolve the recording conflict. These available recording options may then be displayed in a user interface 200 for allowing a user to select desired programs to record from among the available recording options. The functionality of the display as described above with regard to method 400 is also applicable to method 500.

FIG. 6 illustrates an example flow chart of a method 600 of cycling through available recording options for resolving conflicts between programs with coinciding broadcast times. The system is configured to ensure that a user is able to cycle state for each of the plurality of programs in succession. Method 600 includes an act of identifying 605 that a conflict exists. Method 600 also includes an act of storing 610 initial state information. This state information is stored for a plurality of programs and indicates which of the plurality of programs are initially enabled and disabled for recording. For example, as shown in FIG. 3 for system 300, an initial state of A being disabled and B and C being enabled may be recorded.

Method 600 further includes a step for allowing 635 a user to successively change state for a plurality of programs. Step 635 includes an act of receiving 615 user input that changes state of a first program. For example, user input 305 may be received that changes the state of A from disabled to enabled. Step 635 also includes an act of automatically changing 620 state for a second program. For example, in response to the user input 305, the state for B is changed from being enabled to disabled. The disabling of the second program may be based on priority data. Such priority data may be any one of those previously described above. Other exemplary embodiments store the second state information that indicates the change in state for the first and second programs.

Step 635 also includes an act of receiving 625 user input that changes state of the second program. For example, user input 320 may be received that changes the state of B from disabled to enabled. Step 635 also includes an act of automatically changing state of a third program. For example, based on the initial state information, third state 325 is obtained by automatically switching the C program from enabled to disabled state.

User input 330 may be received that changes the state of the third program from disabled to enabled. Based upon the second state information, and potentially the initial state information, the present invention provides for automatically disabling the first program. The initial state information may be based on priority data as previously described. Alternatively, the initial state information may be randomly chosen.

Method 600 may also include an act of generating a user interface 200 that allows a user to visually see and enable or disable a subset of the plurality of programs. The user interface 200 being generated based on the detection of the conflict. Further, other embodiments provide that the first program may include multiple programs, and the user may enable all of the multiple programs in a single user interface. For example, as shown in FIG. 2D, the option rows of column 262 include multiple programs, and a single user input can enable of the multiple programs. In other words, the plurality of programs may be available recording options.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 7:
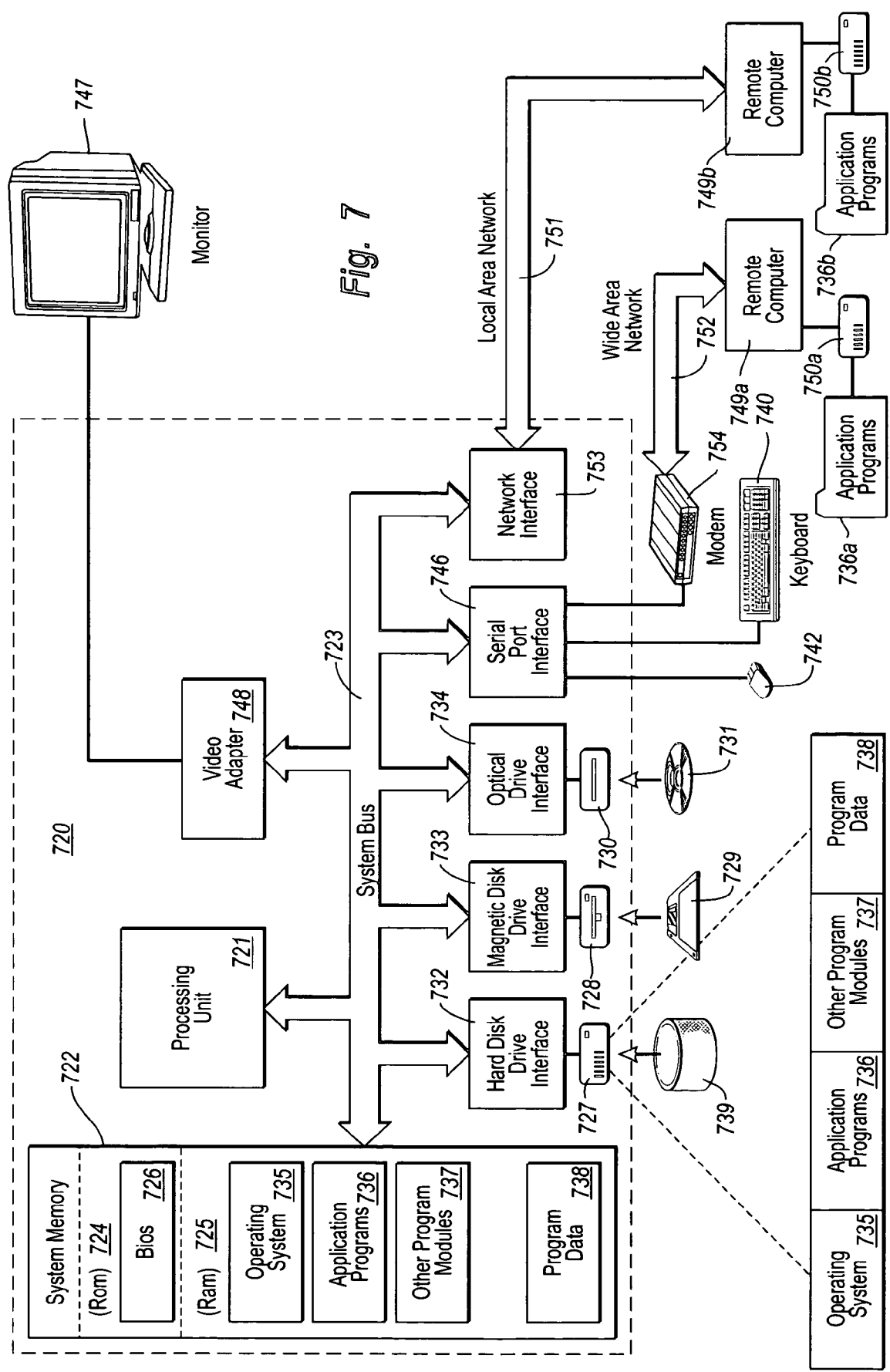
FIG. 7 illustrates an example system that provides a suitable operating environment for the present invention.

FIG. 7 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc., that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 7, an exemplary system for implementing the invention includes a general purpose computing device in the form of a conventional computer 720, including a processing unit 721, a system memory 722, and a system bus 723 that couples various system components including the system memory 722 to the processing unit 721. The system bus 723 may be any of several types of bus structures including a memory bus or memory controller, a peripheral bus, and a local bus using any of a variety of bus architectures. The system memory includes read only memory (ROM) 724 and random access memory (RAM) 725. A basic input/output system (BIOS) 726, containing the basic routines that help transfer information between elements within the computer 720, such as during start-up, may be stored in ROM 724.

The computer 720 may also include a magnetic hard disk drive 727 for reading from and writing to a magnetic hard disk 739, a magnetic disk drive 728 for reading from or writing to a removable magnetic disk 729, and an optical disk drive 730 for reading from or writing to removable optical disk 731 such as a CD-ROM or other optical media. The magnetic hard disk drive 727, magnetic disk drive 728, and optical disk drive 730 are connected to the system bus 723 by a hard disk drive interface 732, a magnetic disk drive-interface 733, and an optical drive interface 734, respectively. The drives and their associated computer-readable media provide nonvolatile storage of computer-executable instructions, data structures, program modules and other data for the computer 720. Although the exemplary environment described herein employs a magnetic hard disk 739, a removable magnetic disk 729 and a removable optical disk 731, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 739, magnetic disk 729, optical disk 731, ROM 724 or RAM 725, including an operating system 735, one or more application programs 736, other program modules 737, and program data 738. A user may enter commands and information into the computer 720 through keyboard 740, pointing device 742, or other input devices (not shown), such as a microphone, joy stick, game pad, satellite dish, scanner, or the like. These and other input devices are often connected to the processing unit 721 through a serial port interface 746 coupled to system bus 723. Alternatively, the input devices may be connected by other interfaces, such as a parallel port, a game port or a universal serial bus (USB). A monitor 747 or another display device is also connected to system bus 723 via an interface, such as video adapter 748. In addition to the monitor, personal computers typically include other peripheral output devices (not shown), such as speakers and printers.

The computer 720 may operate in a networked environment using logical connections to one or more remote computers, such as remote computers 749a and 749b. Remote computers 749a and 749b may each be another personal computer, a server, a router, a network PC, a peer device or other common network node, and typically include many or all of the elements described above relative to the computer 720, although only memory storage devices, 750a and 750b and their associated application programs 736a and 736b have been illustrated in FIG. 7. The logical connections depicted in FIG. 7 include a local area network (LAN) 751 and a wide area network (WAN) 752 that are presented here by way of example and not limitation. Such networking environments are commonplace in office-wide or enterprise-wide computer networks, intranets and the Internet.

When used in a LAN networking environment, the computer 720 is connected to the local network 751 through a network interface or adapter 753. When used in a WAN networking environment, the computer 720 may include a modem 754, a wireless link, or other means for establishing communications over the wide area network 752, such as the Internet. The modem 754, which may be internal or external, is connected to the system bus 723 via the serial port interface 746. In a networked environment, program modules depicted relative to the computer 720, or portions thereof, may be stored in the remote memory storage device. It will be appreciated that the network connections shown are exemplary and other means of establishing communications over wide area network 752 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a home entertainment system including a processor and system memory, the home entertainment system also including a recording device configured to automatically record scheduled television programs, the recording device having a plurality of tuners, a method implemented by the home entertainment system for cycling through available recording options for resolving conflicts between programs with coinciding broadcast times, the home entertainment system configured to ensure that a user is able to cycle state for each of the available recording options in succession, the method comprising acts of:

the processor identifying that a conflict exists within a selected time span between a first, second, and third television program based on coinciding broadcast times for portions of the first, second, and third television programs;

presenting a first recording option indicating that the first television program is not selected for recording and that the second and third television programs are selected for recording in the selected time span;

storing the first recording option as first state information indicating that the first television program is not selected for recording and that the second and third television programs are selected for recording in the selected time span;

receiving first user input selecting the first television program for recording in the selected time span subsequent to storing the first state information;

in response to the first user input selecting the first television program:
 the processor automatically deselecting the second television program for recording based on a user assigned priority of the second television program relative to a user assigned priority of the third television program;
 presenting a second recording option indicating that the second television program is not selected for recording and that the first and third television programs are selected for recording in the selected time span; and
 storing the second recording option as second state information indicating that the second television program is not selected for recording and that the first and third television programs are selected for recording in the selected time span;

receiving second user input selecting the second television program for recording in the selected time span subsequent to storing the second state information; and in response to the second user input selecting the second television program:
 referring to the first and second stored state information to determine that a third recording option indicating that the third television program is not selected for recording and that the first and second programs are selected for recording in the selected time span has not yet been presented;
 the processor automatically deselecting the third television program for recording based on the stored first and second state information to override user assigned priorities indicative of the third television program having a higher priority than the second television program; and
 presenting the third recording option indicating that the third television program is not selected for recording and that the first and second television programs are selected for recording in the selected time span not withstanding that the third television program has a higher user assigned priority than either of the first and second television programs, so as to avoid a ping-pong effect between the first and second recording options.

2. The method of claim 1, wherein the deselecting of the second program is based on priority data.

3. The method of claim 2, wherein the priority data is based on one or more of a percentage of desired program recordings, a ranking of desired program recordings, an order for which the programs where selected for recording, genre of the content for the programs, whether the programs are repeatedly recorded, or whether there are alternative broadcast schedules for the programs.

4. The method of claim 1, wherein the first state information is based on priority data, wherein the priority data is based on one or more of a percentage of desired program recordings, a ranking of desired program recordings, an order for which the programs where selected for recording, genre of the content for the programs, whether the programs are repeatedly recorded, or whether there are alternative broadcast schedules for the programs.

5. The method of claim 1, wherein the first, second and third television programs are available options.

6. The method of claim 1, wherein the first state information is a random selection.

7. The method of claim 1, further comprising an act of:
 generating a user interface that allows a user to visually see and enable or disable a subset of the plurality of programs, the user interface being generated based on the detection of the conflict.

8. The method of claim 1, wherein the first program includes multiple programs and wherein the user enables all the multiple programs within the first program in a single user input.

9. The method of claim 1, wherein programs enabled for recording are identified by one or more of a highlighting, selected radio button or a marked check box.

10. The method of claim 1, wherein one or more programs disabled for are identified by one or more of an unselected radio button or no mark in a check box.

11. In a home entertainment system including a processor and system memory, the home entertainment system also including a recording device configured to automatically record scheduled television programs, the recording device having a plurality of tuners, a method implemented by the home entertainment system for cycling through available recording options for resolving conflicts between programs with coinciding broadcast times, the home entertainment system configured to ensure that a user is able to cycle state for each of the available recording options in succession, the method comprising:
 an act of the processor identifying that a conflict exists within a selected time span between a a first, second, and third television program based on coinciding broadcast times for portions of the first, second, and third television programs;
 an act of presenting a first recording option indicating that the first television program is not selected for recording and that the second and third television programs are selected for recording in the selected time span;
 an act of storing the first recording option as first state information indicatingthat the first television program is not selected for recording and that the second and third television programs are selected for recording in the selected time span;
 based on the initial state information, a step for allowing a user to successively change state for each of the plurality of programs, including:
 receiving first user input selecting the first television program for recording in the selected time span subsequent to storing the first state information;
 in response to the first user input selecting the first television program:
  the processor automatically deselecting the second television program for recording based on a user assigned priority of the second television program relative to a user assigned priority of the third television program;
  presenting a second recording option indicating that the second television program is not selected for recording and that the first and third television programs are selected for recording in the selected time span; and
  storing the second recording option as second state information indicating that the second television program is not selected for recording and that the first and third television programs are selected for recording in the selected time span;

receiving second user input selecting the second television program for recording in the selected time span subsequent to storing the second state information; and in response to the second user input selecting the second television program:

referring to the first and second stored state information to determine that a third recording option indicating that the third television program is not selected for recording and that the first and second programs are selected for recording in the selected time span has not yet been presented;

the processor automatically deselecting the third television program for recording based on the stored first and second state information to override user assigned priorities indicative of the third television program having a higher priority than the second television program; and presenting the third recording option indicating that the third television program is not selected for recording and that the first and second television programs are selected for recording in the selected time span not withstanding that the third television program has a higher user assigned priority than either of the first and second television programs, so as to avoid a ping-pong effect between the first and second recording options.

12. The method of claim 11, wherein the first state information is based on priority data.

13. The method of claim 12, wherein the priority data is based on one or more of a percentage of desired program recordings, a ranking of desired program recordings, an order for which the programs where selected for recording, genre of the content for the programs, whether the programs are repeatedly recorded, or whether there are alternative broadcast schedules for the programs.

14. The method of claim 11, wherein the first state information is a random selection.

15. The method of claim 11, wherein the first program includes multiple programs and wherein the user enables all the multiple programs within the first program in a single user input.

16. The method of claim 11, wherein the plurality of programs are available recording options.

17. The method of claim 11, wherein one or more programs disabled for are identified by one or more of a highlighting, an unselected radio button or no mark in a check box.

18. A computer program product for use in a home entertainment system that includes a recording device configured to automatically record scheduled television programs, the recording device having a plurality of tuners, the computer program product for implementing a method of cycling through available recording options for resolving conflicts between programs with coinciding broadcast times, the system configured to ensure that a user is able to cycle state for each of available recording options in succession, the computer program product comprising one or more computer storage media having stored thereon computer executable instructions that, when executed by a processor, cause the distributed computing system to perform the following:

identify that a conflict exists within a selected time span between a first, second and third television programs based on coinciding broadcast times for portions of the first, second, and third television programs;

present a first recording option indicating that the first television program is not selected for recording and that the second and third television programs are selected for recording in the selected time span;

store the first recording option as first state information indicating that the first television program is not selected for recording and that the second and third television programs are selected for recording in the selected time span;

receive first user input selecting the first television program for recording in the selected time span subsequent to storing the first state information;

in response to the first user input selecting the first television program:

deselect the second television program for recording based on a user assigned priority of the second television program relative to a user assigned priority of the third television program;

present a second recording option indicating that the second television program is not selected for recording and that the first and third television programs are selected for recording in the selected time span; and store the second recording option as second state information indicating that the second television program is not selected for recording and that the first and third television programs are selected for recording in the selected time span;

receive second user input selecting the second television program for recording in the selected time span subsequent to storing the second state information; and refer to the first and second stored state information to determine that a third recording option indicating that the third television program is not selected for recording and that the first and second programs are selected for recording in the selected time span has not yet been presented;

deselect the third television program for recording based on the stored first and second state information to override user assigned priorities indicative of the third television program having a higher priority than the second television program; and present the third recording option indicating that the third television program is not selected for recording and that the first and second television programs are selected for recording in the selected time span not withstanding that the third television program has a higher user assigned priority than either of the first and second television programs, so as to avoid a ping-pong effect between the first and second recording options.

19. The computer program product of claim 18, wherein the deselecting of the second television program is based on priority data.

20. The computer program product of claim 19, wherein the priority data is based on one or more of a percentage of desired program recordings, a ranking of desired program recordings, an order for which the programs where selected for recording, genre of the content for the programs, whether the programs are repeatedly recorded, or whether there are alternative broadcast schedules for the programs.

21. The computer program product of claim 18, wherein the first state information is based on priority data.

22. The computer program product of claim 21, wherein the priority data is based on one or more of a percentage of desired program recordings, a ranking of desired program recordings, an order for which the programs where selected for recording, genre of the content for the programs, whether the programs are repeatedly recorded, or whether there are alternative broadcast schedules for the programs.

23. The computer program product of claim 18, wherein the first state information is a random selection.

24. The computer program product of claim 18, further comprising computer executable instructions that:
   generate a user interface that allows a user to visually see and enable or disable a subset of the plurality of programs, the user interface being generated based on the detection of the conflict.

25. The computer program product of claim 18, wherein the first program includes multiple programs and wherein the user enables all the multiple programs within the first program in a single user input.

26. The computer program product of claim 18, wherein programs enabled for recording are identified by one or more of a highlighting, selected radio button or a marked check box.

27. The computer program product of claim 18, wherein one or more programs disabled for are identified by one or more of an unselected radio button or no mark in a check box.

* * * * *